US008816970B2

(12) United States Patent
Wang et al.

(10) Patent No.: US 8,816,970 B2
(45) Date of Patent: Aug. 26, 2014

(54) TOUCH PANEL, TOUCH DISPLAY PANEL, AND TOUCH SENSING METHOD (75) Inventors: Wen-Chun Wang, Taichung (TW); Wen-Tui Liao, Taichung (TW); Ching-Fu Hsu, Taichung County (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 338 days.

(21) Appl. No.: 13/025,166

(22) Filed: Feb. 11, 2011

(65) Prior Publication Data
US 2011/0199324 A1 Aug. 18, 2011

(30) Foreign Application Priority Data

Feb. 12, 2010 (TW) ................................ 99104800 A (51) Int. Cl.
G06F 3/041 (2006.01)
G06F 3/044 (2006.01)
G06F 3/045 (2006.01)

(52) U.S. Cl.
CPC .............. G06F 3/0412 (2013.01); G06F 3/044 (2013.01); G06F 3/045 (2013.01)
USPC ...... 345/173; 345/174; 178/18.05; 178/18.06

(58) Field of Classification Search
USPC ...................... 345/173, 174; 178/18.01–18.11
See application file for complete search history.

(56) References Cited

U.S. PATENT DOCUMENTS

| 4,571,454 A | 2/1986 | Tamaru et al. |
| 6,825,890 B2 * | 11/2004 | Matsufusa ...................... 349/12 |
| 2004/0169643 A1 * | 9/2004 | Tseng ............................ 345/173 |
| 2006/0097991 A1 * | 5/2006 | Hotelling et al. ............. 345/173 |
| 2007/0062739 A1 * | 3/2007 | Philipp et al. ............... 178/18.06 |
| 2007/0198926 A1 | 8/2007 | Joguet et al. |
| 2009/0188726 A1 * | 7/2009 | Chang et al. ................ 178/18.03 |
| 2010/0033443 A1 * | 2/2010 | Hashimoto .................... 345/173 |
| 2010/0053032 A1 * | 3/2010 | Lai .................................. 345/30 |
| 2010/0265210 A1 * | 10/2010 | Nakanishi et al. ............. 345/174 |

FOREIGN PATENT DOCUMENTS

| CN | 101515095 | 8/2009 |
| CN | 101551721 | 10/2009 |
| CN | 101634915 | 1/2010 |

(Continued)

OTHER PUBLICATIONS

"Office Action of China Counterpart Application", issued on Oct. 19, 2012, p. 1-p. 6.

(Continued)

Primary Examiner — Koosha Sharifi-Tafreshi
(74) Attorney, Agent, or Firm — Jianq Chyun IP Office (57) ABSTRACT A touch panel including first electrode bands, second electrode bands, and a transparent dielectric material is provided. The first electrode bands are disposed on a first substrate and extended in a first direction, wherein each of the first electrodes has a plurality of first slits in the form of enclosed configuration. The second electrode bands are disposed on a second substrate, facing to the first electrode bands, and extended in a second direction interlacing the first direction. Each second electrode band is partially exposed by the first slits. The transparent dielectric material is disposed between the first electrode bands and the second electrode bands to provide a changeable gap.

11 Claims, 5 Drawing Sheets

(56) References Cited

FOREIGN PATENT DOCUMENTS

| | | |
|---|---|---|
| TW | 200915160 | 4/2009 |
| TW | 200939176 | 9/2009 |
| TW | 201003487 | 1/2010 |

OTHER PUBLICATIONS

"Office Action of Taiwan Counterpart Application", issued on Jun. 20, 2013, p. 1-p. 7.

* cited by examiner

TOUCH PANEL, TOUCH DISPLAY PANEL, AND TOUCH SENSING METHOD

CROSS-REFERENCE TO RELATED APPLICATION

This application claims the priority benefit of Taiwan application serial no. 99104800, filed on Feb. 12, 2010. The entirety of the above-mentioned patent application is hereby incorporated by reference herein and made a part of this specification.

BACKGROUND OF THE INVENTION

1. Field of the Invention

The invention is related to a touch panel, and particularly, to a touch panel capable of performing various touch sensing functions.

2. Description of Related Art

At present, the touch panels can be generally classified into resistive, capacitive, optical, acoustic, and electromagnetic touch panels, wherein the resistive touch panels and the capacitive touch panels are most common.

In a resistive touch panel, the touch sensing principle is based on that two independent conductive layers contact with each other by a pressure of a single pressing point so that the two independent conductive layers are electrically connected. A sensing signal is generated at the pressing point of the resistive touch panel and a coordinate of the pressing point on the touch panel is determined according to the sensing signal. In a capacitive touch panel, the sensing principle is based on that an electric field is formed in a touch sensing electrode so that a slight change of a capacitance is generated in the touch sensing electrode when a conductive element such as a finger of a user contacts the touch sensing electrode, and a coordinate of the contacting point on the touch panel is determined according to the change of the capacitance.

The capacitive touch panel is commonly advantageous in facilitating a hand writing function and a multi touch function. Nevertheless, a restriction of the capacitive touch panel is that the user can only use the conductive element to operate the capacitive touch panel. Therefore, the user can not operate the capacitive touch panel when wearing a glove or by using a non conductive material such as a common plastic touch pen. The resistive touch panel is commonly advantageous in facilitating the operation by various materials. However, the restriction of the resistive touch panel is that it fails to have a multi touch function.

SUMMARY OF THE INVENTION

The invention is directed to a touch panel having various touch sensing functions through modifying the patterns of the electrode bands.

The invention provides a touch panel including first electrode bands, second electrode bands, and a transparent dielectric material. The first electrode bands are disposed on a first substrate, and extended in a first direction, wherein each of the first electrode bands has a plurality of first slits in the form of enclosed configuration. The second electrode bands are disposed on a second substrate, facing to the first electrode bands, and extended in a second direction interlacing the first direction. Each second electrode band is partially exposed by the first slits. The transparent dielectric material is disposed between the first electrode bands and the second electrode bands to provide a changeable gap.

In view of the above, the electrode bands extended in two different directions are interlacing disposed and facing to one another so as to be served as the touch sensing electrodes in the invention. In addition, the electrode bands which are extended in one direction and adjacent to the user at the operation side are configured with a plurality of slits to expose the electrode bands extended in the other direction. Thereby, the touch panel and the touch display panel both have the resistive touch sensing function and the capacitive touch sensing function. Accordingly, the user can operate the touch panel and the touch display panel through any material.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
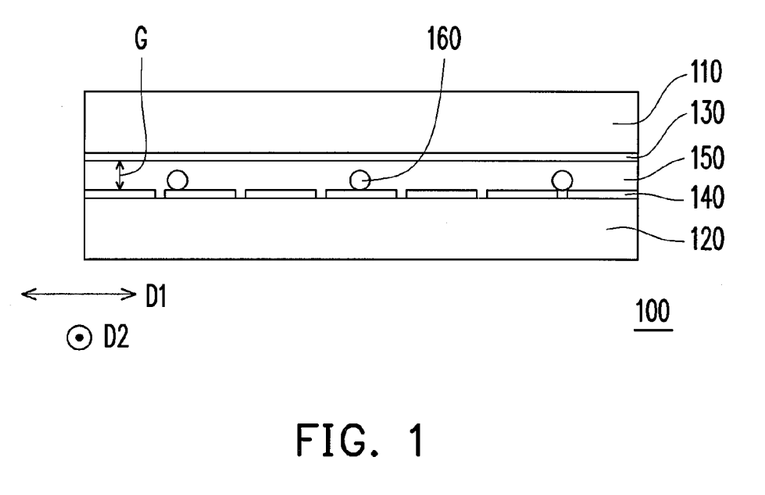
FIG. 1 is a cross-sectional view of a touch panel according to an embodiment of the invention.

FIG. 1 is a cross-sectional view of a touch panel according to an embodiment of the invention. Referring to FIG. 1, a touch panel 100 includes a first substrate 110, a second substrate 120, a plurality of first electrode bands 130, a plurality of second electrode bands 140, and a transparent dielectric material 150. The first electrode bands 130 are disposed on the first substrate 110, while the second electrode bands 140 are disposed on the second substrate 120. The first electrode bands 130 are disposed facing to the second electrode bands 140. The transparent dielectric material 150 is disposed between the first electrode bands 130 and the second electrode bands 140 so that a gap G is formed between the first substrate 110 and the second substrate 120. For facilitating the changeable gap G, the transparent dielectric material 150 does not have a fixed shape, and can be made of a flexible material, such as air, silicon gel, silicon oil, or the like.

In addition, the touch panel 100 can selectively include a plurality of insulating spacers 160. The insulating spacers 160 are disposed between the first electrode bands 130 and the second electrode bands 140. In an embodiment, a height of the insulating spacers 160 is about 3 μm to 4 μm and the gap G is substantially larger than the height of the insulating spacers 160 when the touch panel 100 is not pressed.

Figure 2:
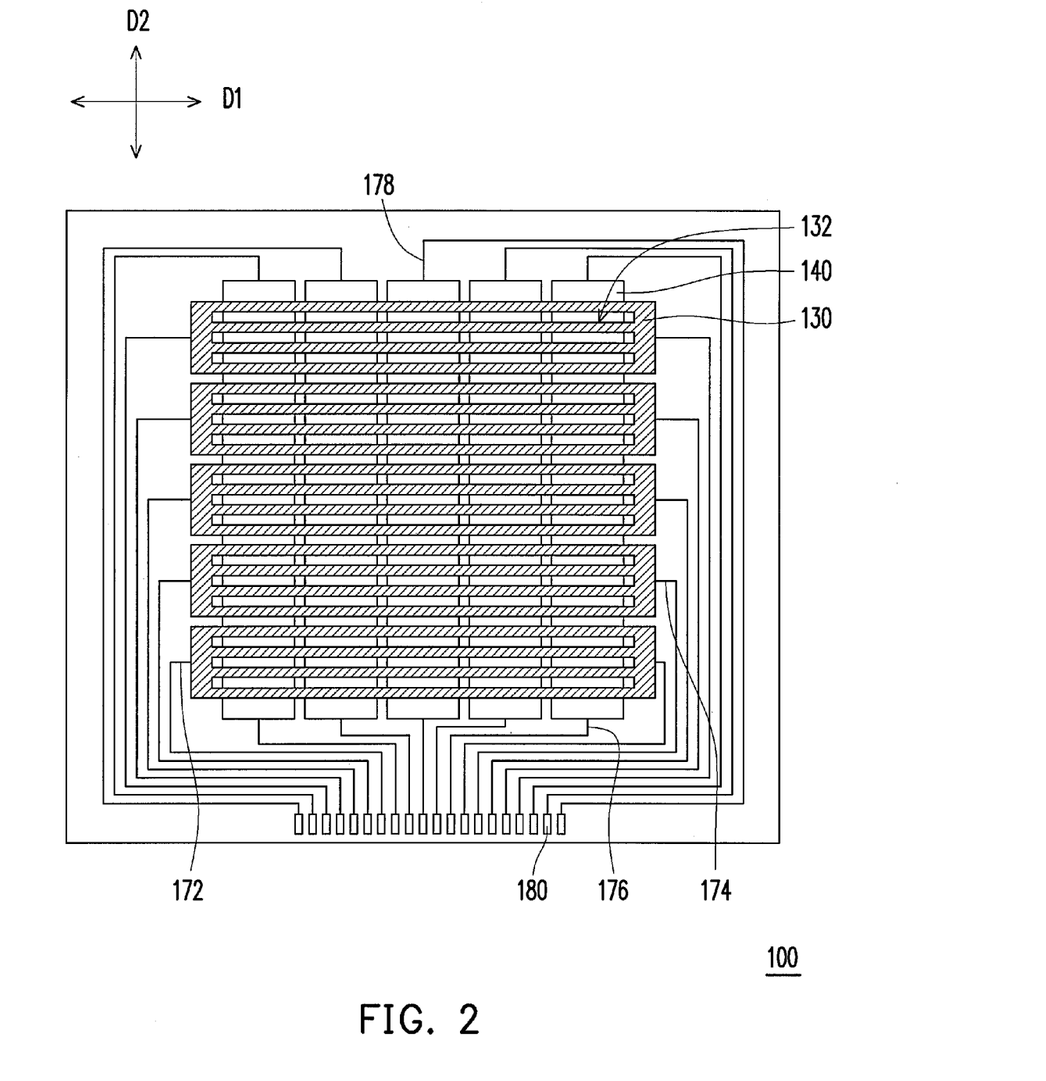
FIG. 2 is a schematic top view of a touch panel according to an embodiment of the invention.

FIG. 2 is a schematic top view of a touch panel according to an embodiment of the invention. Referring to FIG. 1 and FIG. 2 together, each of the first electrode bands 130 is extended in a first direction D1 and has a plurality of enclosed slits 132. Each of the second electrode bands 140 is extended in a second direction D2. When the first electrode bands 130 and the second electrode bands 140 are disposed facing to each other, the slits 132 partially expose a portion of each of the second electrode bands 140 overlapped with the first electrode bands 130. In the present embodiment, each of the slits 132 is extended in the first direction D1 to simultaneously expose a plurality of the second electrode bands 140.

In the first substrate 110 of the present embodiment, the user can directly press the first substrate 110 to electrically connect one first electrode band 130 to the corresponding second electrode band 140 so that the resistive touch function is achieved. In addition, the slits 132 of the first electrode bands 130 expose a portion of each of the second electrode bands 140 and a parasitic capacitance is formed between the two electrode bands. When the user performs the touch operation through a finger or a conductive material, the capacitance formed between the first electrode bands 130 and the second electrode bands 140 can be changed so that the touch panel 100 can determine the touch operation of the user. Accordingly, the touch panel 100 also has a capacitive touch sensing function, wherein the capacitive touch sensing function can be a self-capacitive sensing function or a mutual-capacitive touch sensing function.

In addition to the capacitive touch sensing method, the touch panel 100 of the present embodiment further performs the resistive touch sensing process. In the touch panel 100, two ends of each of the electrode bands 130 and 140 are respectively connected to a driving chip (not shown), and the resistive touch sensing process includes the steps described as follows. First, a first voltage variation is formed in the first electrode bands 130 simultaneously and the second electrode bands 140 are used for performing the sensing step. Subsequently, a second voltage variation is formed in the second electrode bands 140 simultaneously and the first electrode bands 130 are used for performing the sensing step.

In a real circumstance, one ends of the first electrode bands 130 are electrically connected and the other ends of the first electrode bands 130 are electrically connected through the circuit processing of the driving chip (not shown). Similarly, one ends of the second electrode bands 140 are electrically connected and the other ends of the second electrode bands 140 are electrically connected as well as through the circuit processing of the driving chip (not shown). Accordingly, the required voltages are not input to the electrode bands 130 and 140 one by one, and the driving method of the touch panel 100 can be performed by the known driving method of the four-wire resistive touch panel.

Nevertheless, the resistive touch sensing process depicted above merely accomplishes the single point touch function. If the multi touch function is required, the following steps are performed. First, a voltage variation is formed in the first electrode bands 130 sequentially and the second electrode bands 140 are used for performing the sensing step. Thereafter, the voltage variation is formed in the second electrode bands 140 sequentially and the first electrode bands 130 are used for performing the sensing step. In other words, to facilitate the multi touch function by performing the resistive touch sensing process, the first electrode bands 130 of the touch panel 100 have the voltage variation asynchronously. Therefore, the touch panel 100 determines the position of the touch point based on the time the second electrode bands 140 receiving the touch signal. The second electrode bands 140 similarly have the voltage variation asynchronously. The touch panel 100 thus determines the position of the touch point based on the time the first electrode bands 130 receiving the touch signal.

As a whole, the touch panel have the advantages of both the resistive touch sensing function and the capacitive touch sensing function. The user can use various materials to operate the touch panel 100 by performing the resistive touch sensing process so as to increase the convenience of usage. In addition, the damage caused by multiple times of contacting the first substrate 110 and the second substrate 120 are prevented. Therefore, the lifetime of the touch panel 100 is increased. Furthermore, the first electrode bands 130 and the second electrode bands 140 of the touch panel 100 are band-like to provide the multi touch function to further broaden the application. It is noted that the touch panel 100 can select one of the above-mentioned capacitive touch sensing processes and one of the aforesaid resistive touch sensing processes to perform the touch sensing method. Therefore, the capacitive touch sensing process adopted in the present embodiment is not restricted in the self capacitance mode or the mutual capacitance mode, and the resistive touch sensing process is not restricted in the single point mode or the multi point mode.

Referring to FIG. 2 continuously, the electrode bands 130 and 140 of the touch panel 100 are required electrically connecting with the driving chip (not shown) to perform the abovementioned touch sensing method. Therefore, the touch panel 100 further includes a plurality of first transmission lines 172, a plurality of second transmission lines 174, a plurality of transmission lines 176, a plurality of fourth transmission lines 178, and a plurality of pads 180 connected to the transmission lines. Each of the first transmission lines 172 and corresponding one of the second transmission lines 174 are respectively connected to two opposite ends of one first electrode band 130. Similarly, each of the third transmission lines 176 and corresponding one of the fourth transmission lines 178 are respectively connected to two opposite ends of one second electrode band 140.

The connection between the transmission lines 172~178 and the pads 180 are not limited in the invention. For simplified the description, the portion of the pads 180 connected to the first electrode bands 130 are named first pads and the other portion of the pads 180 connected to the second electrode bands 140 are named second pads. In an embodiment, the first pads of the pads 180 are disposed on the first substrate 110, and the second pads of the pads 180 are disposed on the second substrate 120. Therefore, the first transmission lines 172 and the second transmission lines 174 are directly connected to the pads 180 disposed on the first substrate 110. Similarly, the third transmission lines 176 and the fourth transmission lines 178 are directly connected to the pads 180 disposed on the second substrate 120.

Figure 3:
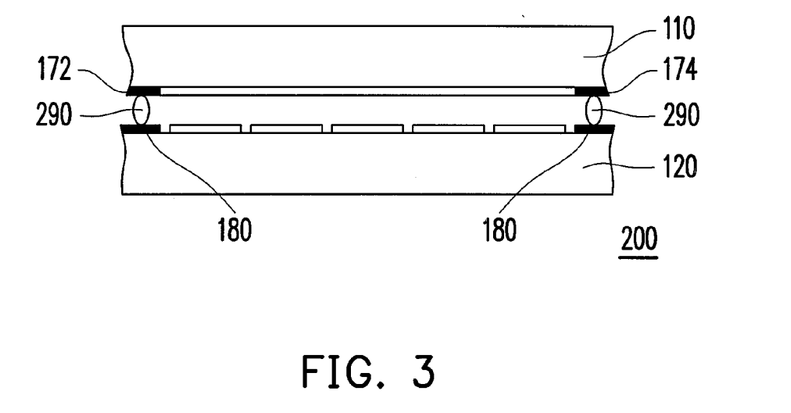
FIG. 3 is a cross-sectional view of a touch panel according to another embodiment of the invention.

In another embodiment, all pads 180 including the first pads and the second pads are disposed on the second substrate 120. Herein, the cross-section view of the touch panel can be shown in FIG. 3 according to another embodiment. The touch panel 200 further includes a plurality of conductive spacers 290 for connecting the first transmission lines 172 and the second transmission lines 174 disposed on the first substrate 110 to the corresponding pads 180 disposed on the second substrate 120. The conductive spacers 290 are disposed between the first substrate 110 and the second substrate 120.

Figure 4:
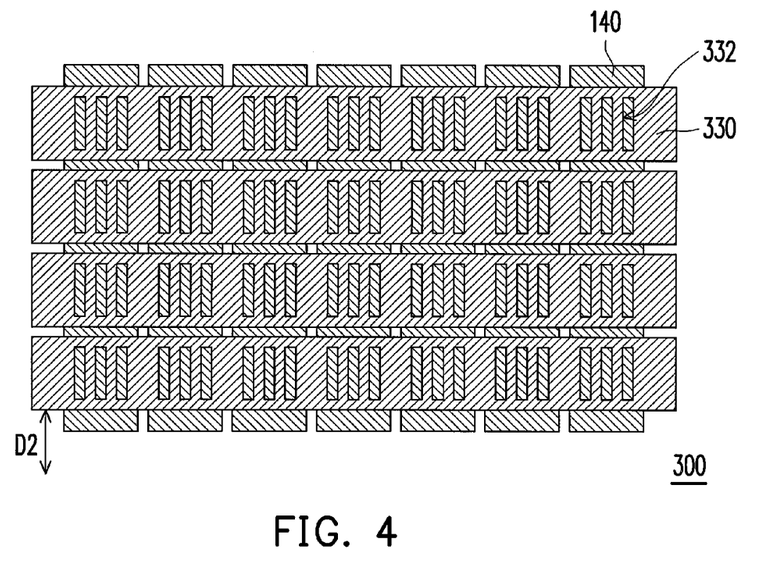
FIG. 4 is a schematic top view of a touch panel according to another embodiment of the invention.
Figure 5:
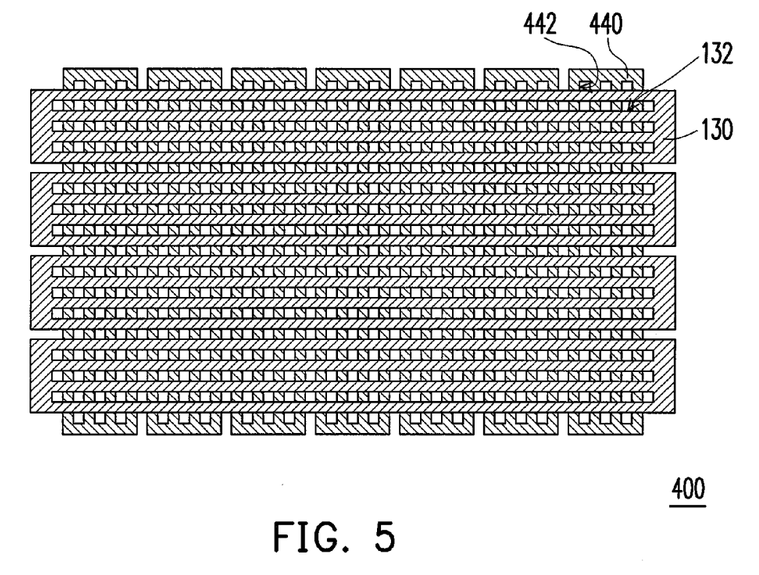
FIG. 5 is a schematic top view of a touch panel according to further another embodiment of the invention.

FIG. 4 and FIG. 5 are schematic top views of touch panels according to further another two embodiments of the invention. Referring to FIG. 4, in the touch panel 300, the first slits 332 of the first electrode bands 330 are extended in the extending direction of the second electrode bands 140, i.e. the second direction D2. The slits 332 are enclosed, and the disposition of the slits 332 makes the second electrode bands 140 be partially exposed in the top view diagram.

Referring to FIG. 5, the first electrode bands 130 of the touch panel 400 have the enclosed first slits 132 and the second electrode bands 440 have the enclosed second slits 442. Namely, the electrode bands 130 and 440 extending in different directions both have slits in the present embodiment, wherein the extending direction of the first slits 132 is parallel to the extending direction of the first electrode bands 130 and the extending direction of the second slits 442 is parallel to the second electrode bands 440. It is noted that the second slits 442 of the second electrode bands 440 are provided to reduce the coupled capacitance between the first electrode bands 130 and the second electrode bands 440 so as to reduce the burden of the driving chip. However, if the capacitance loading ability of the driving chip is increased, the second electrode bands 440 can be replaced by the second electrodes 140 mentioned in the aforesaid embodiments which are configured without the slits.

Specifically, the touch panel 300 can have the resistive touch sensing function and the capacitive touch sensing function by exposing the second electrode bands 140(440) through the design of the slits. However, the sensitivity of the capacitive touch sensing function is determined to the exposed area of the electrode, so that the disposition location, the size, and the patterns of the slits are adjusted according to the requirement of the products and are not particularly restricted.

Figure 6:
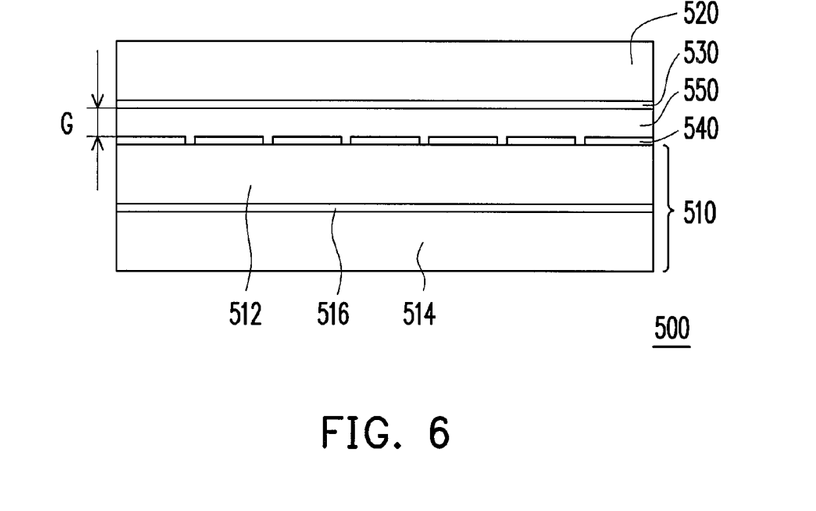
FIG. 6 illustrates a touch display panel according to an embodiment of the invention.
Figure 7:
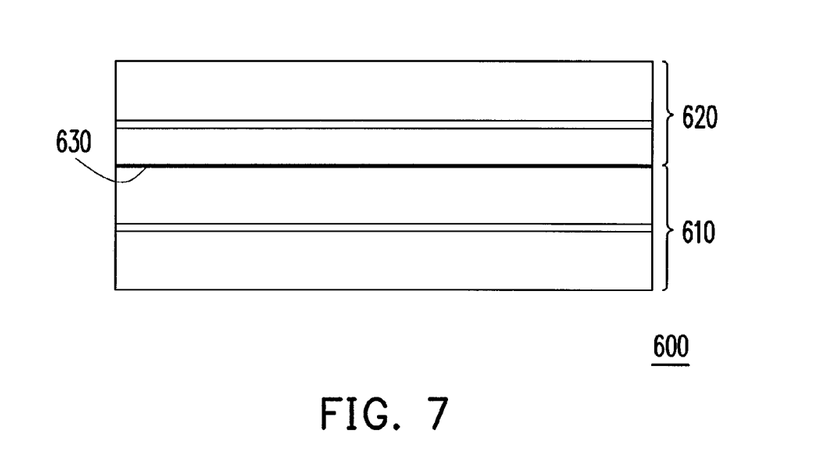
FIG. 7 illustrates a touch display panel according to another embodiment of the invention.

FIG. 6 and FIG. 7 illustrate touch display panels according to two embodiments of the invention. Referring to FIG. 6 first, a touch display panel 500 includes a flat display panel 510, a first substrate 520, a plurality of first electrode bands 530, a plurality of second electrode bands 540, and a transparent dielectric material 550. The flat display panel 510 can be a liquid crystal display panel, a plasma display panel, an organic electro-luminescence display panel, or a electronic paper display panel. The flat display panel 510 includes an upper substrate 512, a bottom substrate 514, and a display medium 516 disposed between the upper substrate 512 and the bottom substrate 514.

The second electrode bands 540 are directly disposed on a surface of the upper substrate 512 of the flat display panel 510 away from the display medium 516 so as to accomplish the combination of the touch panel and the display panel. In the present embodiment, the first electrode bands 530 can be the first electrode bands 130 or the first electrode bands 330 depicted in the aforementioned embodiments, and the second electrode bands 540 can be the second electrode bands 140 or the second electrode bands 440 as shown in the foregoing embodiments. Furthermore, the transparent dielectric material 550 includes air, silicon gel, silicon oil, or the like which is a non-rigid material. Therefore, the touch display panel 500 can adopt the aforesaid touch sensing method to facilitate the resistive touch sensing function, the capacitive touch sensing function, and the multi touch function.

In other embodiments, referring to FIG. 7, a touch display panel 600 is formed by connecting a flat display panel 610 and a touch panel 620 through an adhesion layer 630. Herein, the touch panel 620 can be selected from the touch panel 200, the touch panel 300, or the touch panel 400 of the aforesaid embodiments. Namely, the touch panel 620 and the display panel 610 are combined by being directly adhered together, or by fabricating a part of the elements of the touch panel 620 on one substrate of the display panel 610.

In summary, the electrode bands extended in two different directions are interlacing disposed and facing to one another so as to be served as the touch sensing electrodes in the invention. In addition, the electrode bands of one direction are adjacent to the user at the operation side and are configured with a plurality of enclosed slits to expose the electrode bands of the other direction. Therefore, the touch panel and the touch display panel of the invention have both the resistive touch sensing function and the capacitive touch sensing function. In addition, the electrode bands are disposed in array so that the multi touch function can be achieved by performing the resistive touch sensing process or the capacitive touch sensing process.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A composite touch panel of capacitive and resistive touch sensing functions, comprising:
   a plurality of first electrode bands disposed on a first substrate and extended in a first direction, wherein each of the first electrodes has a plurality of first slits in a form of enclosed configuration;
   a plurality of second electrode bands disposed on a second substrate, facing to the first electrode bands, and extended in a second direction interlacing the first direction, wherein each of the second electrode bands is partially exposed by the first slits; and
   a transparent dielectric material disposed between the first electrode bands and the second electrode bands to provide a changeable gap, so that the first electrode bands and the second electrode bands are electrically connected and in contact at where the changeable gap is reduced due to the first substrate is pressed.

2. The composite touch panel of capacitive and resistive touch sensing functions according to claim 1, wherein each of the first slits is extended in the first direction or in the second direction.

3. The composite touch panel of capacitive and resistive touch sensing functions according to claim 1, wherein each of the second electrode bands has a plurality of second slits in the form of enclosed configuration.

4. The composite touch panel of capacitive and resistive touch sensing functions according to claim 3, wherein the first slits and the second slits are respectively extended in different directions.

5. The composite touch panel of capacitive and resistive touch sensing functions according to claim 1, further comprising:
   a plurality of first transmission lines disposed on the first substrate;
   a plurality of second transmission lines disposed on the first substrate, wherein each of the first transmission lines and corresponding one of the second transmission lines are respectively connected to two opposite ends of one of the first electrode bands;
   a plurality of third transmission lines disposed on the second substrate; and
   a plurality of fourth transmission lines disposed on the second substrate, wherein each of the third transmission lines and corresponding one of the fourth transmission lines are respectively connected to two opposite ends of one of the second electrode bands.

6. The composite touch panel of capacitive and resistive touch sensing functions according to claim 5, further comprising a plurality of first pads and a plurality of second pads, wherein the first pads are electrically connected to the first transmission lines and the second transmission lines and the second pads are electrically connected to the third transmission lines and the fourth transmission lines.

7. The composite touch panel of capacitive and resistive touch sensing functions according to claim 6, wherein the first pads are disposed on the first substrate, and the second pads are disposed on the second substrate.

8. The composite touch panel of capacitive and resistive touch sensing functions according to claim 6, wherein the first pads and the second pads are disposed on the second substrate.

9. The composite touch panel of capacitive and resistive touch sensing functions according to claim 8, further comprising a plurality of conductive spacers connected between the first transmission lines and a part of the first pads and connected between the second transmission lines and another part of the first pads.

10. The composite touch panel of capacitive and resistive touch sensing functions according to claim 1, wherein the transparent dielectric material comprises air, silicon gel, or silicon oil.

11. The composite touch panel of capacitive and resistive touch sensing functions according to claim 1, further comprising a plurality of insulating spacers disposed between the first electrode bands and the second electrode bands.

* * * * *